J. A. C. Rose.
Corn Harvester.
Nº 87071 Patented Feb. 16, 1869.
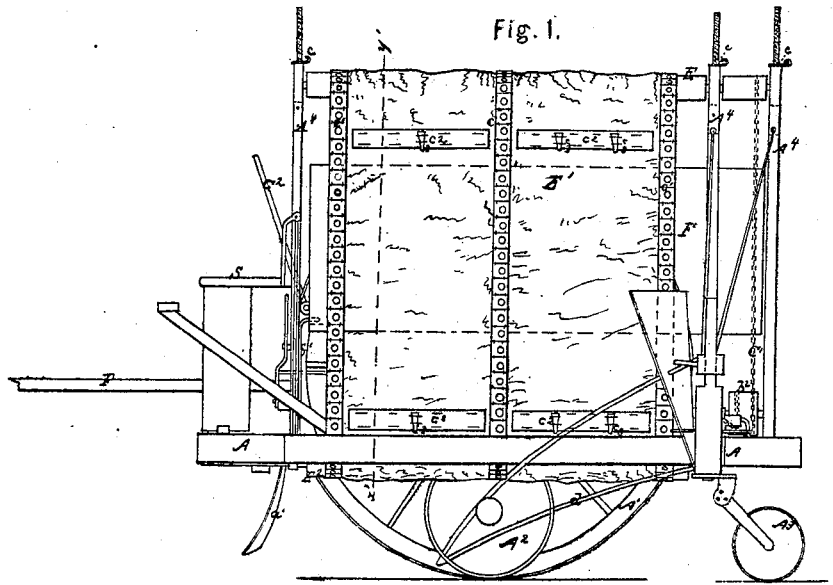
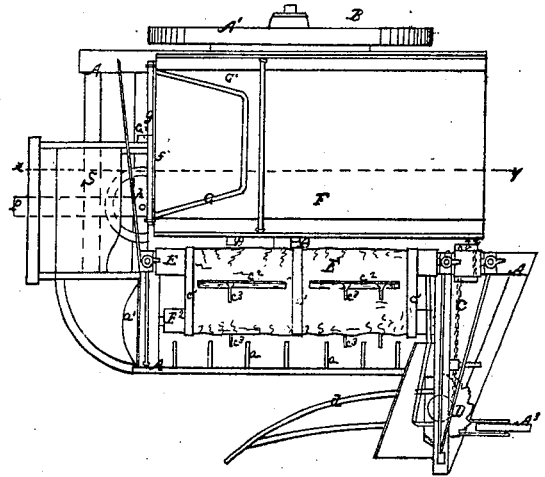
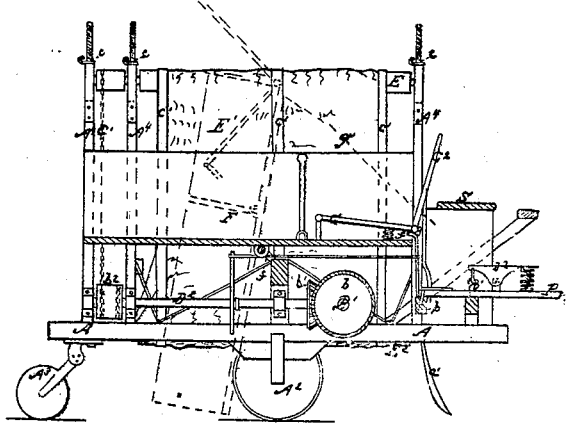
Witnesses.
Henry Flad
Chas H Boyle
Inventor
J. A. C. Rose
By his Atty
M Randolph

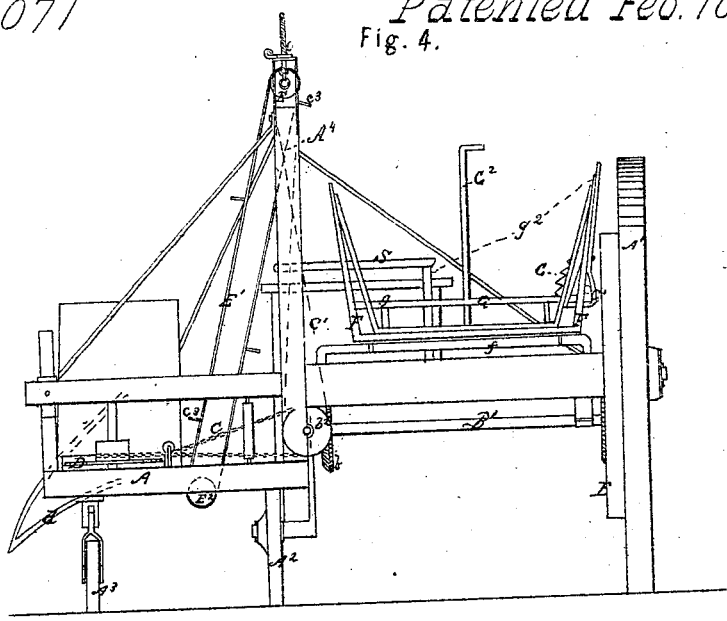

UNITED STATES PATENT OFFICE.

JAMES A. C. ROSE, OF CARROLLTON, ILLINOIS.

IMPROVEMENT IN CORN-HARVESTERS.

Specification forming part of Letters Patent No. 87,071, dated February 16, 1869.

*To all whom it may concern:*

Be it known that I, JAMES A. C. ROSE, of Carrollton, in the county of Greene and State of Illinois, have invented a new and useful Improvement in Corn-Harvesters; and I do hereby declare that the following is a full and clear description thereof, reference being had to the accompanying drawings, and to the letters of reference marked thereon.

This invention relates, first, to a device for cutting the standing corn; secondly, to one for conveying the cut corn to a receptacle, where it is retained until a sufficient quantity has accumulated to form a shock; thirdly, to the accumulator and its various devices, where the cut corn is received from the conveyer, held in place until the proper time, and then dropped into a shock and left standing.

There are various details of the machine, rendered necessary for its perfect working, and hereinafter more fully explained.

To enable those skilled in the art to construct and use my improved harvester, I will proceed to describe its construction and operation.

Figure 1, Sheet 1, of the drawings is a side elevation of the said harvester, showing the side of the conveyer. Fig. 2, Sheet 1, is a general plan of the whole harvester. Fig. 3, Sheet 1, is a sectional elevation taken on the line $x\ y$ in Fig. 1. Red lines in this figure show the position of the box or accumulator when it is turned back so as to dump the collected corn into a shock. Fig. 4, Sheet 2, is a rear-end elevation of the machine. Fig. 5, Sheet 2, is a transverse sectional elevation taken on line $x'\ y'$ of Fig. 1.

A is the general frame-work of the machine, and is supported on the large wheel $A^1$, the small wheel $A^2$, and the caster-wheel $A^3$, the latter of which supports the projecting arm of the frame-work that sustains the cutter.

A cogged wheel, B, secured to the inside of the wheel $A^1$, transmits motion, through the medium of a small pinion, to the shaft $B^1$, and this shaft, in turn, transmits the motion thus acquired, through the medium of the bevel-geared wheels $b\ b^1$, to the shaft $B^2$, and the band-wheel $b^2$ on the remaining end of the latter shaft drives, by means of belts C and C', the whole of the cutting and conveying machinery. The belt C transmits motion to the horizontal cutter D. This cutter is a rotary serrated disk, each tooth of which has a jagged, roughened edge, like a sickle-knife. The cutter is rotated so as to strike standing corn with the backs of the teeth—that is, in the opposite direction to that in which a saw is driven through wood. The height that the cutter is placed from the ground is just the distance the stumps of the stalks are to remain standing, and may be adjusted as may be required.

As the machine is drawn along over the field the guard $d$ gathers up the straggling stalks and holds them up to the cutter. The belt C' drives a longitudinal shaft, E, which finds its bearings in the upper ends of the posts $A^4$. Screw-tighteners $e$ may be attached to the bearings of the shaft E, for the purpose of tightening up the belt C' and the conveyer-apron $E^1$, which is drawn around the shafts E and $E^2$, and is driven by the former. The conveyer-apron $E^1$ may be formed of any strong textile fabric secured to flexible metallic bands, or even leather or india-rubber bands $e^1$. At regular intervals a transverse metallic stay-piece, $e^2$, will be secured to the exterior surface of the conveyer-apron, and hooks $e^3$, projecting outward (and upward on the outside) therefrom, will seize the cut stalks of the corn as they fall from the cutter V, or rather the corn, as it falls from the said cutter, will fall onto and be taken up by the hooks of the conveyer and be carried horizontally over the top of the roller or shaft E and thrown into the receptacle F. As the stalks falls from the cutter the top ends of them will fall forward, and consequently they will be delivered into the receptacle F in that position. The teeth $a$, projecting inwardly from the outside side beam of the frame A, will prevent the cut corn from falling down between the said beam and the apron-conveyer to the ground. A scraper, $a'$, on the front of the frame A, and placed directly in front of the roller or shaft $E^2$, will prevent rubbish or any impediment from striking the hooks of the conveyer so as to injure them.

The accumulator or receptacle F is very similar to a cart-body. It has a bottom and two sides, but both ends should be left open. It is hinged to the rod $f$, attached to the axle of the apparatus, and the front end is held down while it is being loaded by the hook $f^1$, attached to the frame A. When this receptacle is loaded it may be dumped backward on its hinge $f$, as is shown by red lines in Fig. 3. When in this position the corn-stalks will spread out wide at the butts, which will be at the back end of the machine, in the proper position for them to stand when in the shock upon the field. To assist in this very important disposition of the stalks, their small or top ends will be held down close to the bottom of the box or receptacle F while it is being dumped, by the clamp G, which is a kind of iron crab, hinged by its axle $g$ to the front end of the box F, and held down upon the corn by the serrated spring $G^1$. An arm, $G^2$, attached to the crab G, may be used by the driver, who sits upon the seat S, to throw the clamp or crab back upon the stalks preparatory to dumping them into the shock.

A cord, $g^1$, attached to or near the driver's seat, may be used by him to draw the box F down to its horizontal position after it shall have been unloaded, and it will also be useful to prevent the tipping of the said box farther than is required. Another cord, $g^2$, likewise attached to or near the driver's seat, and also to the serrated spring $G^1$, may be used by the driver to release the said spring from the crab when the stalks are to be released.

In order to facilitate the turning of this machine in a small space, I attach the pole P to the frame A by means of two pins, $p$ $p^1$. To one of these pins—say $p^1$—I attach a lever, $p^2$, with a spring under its outer end, so as to hold the pin in its place when left free. The outer end of the lever is to be placed in such a position that the driver may easily press down on it with one of his feet, and by so doing the pin $p^1$ will be drawn out of the frame A, and the pole left free to turn on its remaining attachment, when it will be capable of turning the machine in a much more contracted space than could be done with both pins in place. As soon as the machine shall have been turned around and the pole drawn out straight again, the lever $p^2$ may be released again, when the withdrawn pin will be replaced, as before.

The wheel $A^1$ may or may not be corrugated, as found most expedient.

Having described my invention, what I claim is—

1. The method herein described of collecting cut corn into a receptacle or box, F, and then dumping it, butt-end down, upon the field in the form of a shock.

2. The clamp G and spring $G^1$, when applied to and combined with the box or receptacle F, as herein set forth.

3. The attachment of the pole P to the frame A by means of two pins, $p$ $p^1$, and the application to the latter of the spring-lever $p^2$, substantially as described and set forth.

J. A. C. ROSE.

Witnesses:
THOMAS D. PRICE,
THOS. MUM.